(12) United States Patent
Slothower et al.

(10) Patent No.: US 6,286,808 B1
(45) Date of Patent: Sep. 11, 2001

(54) GRAVITY FLOW FAUCET

(75) Inventors: Erich D. Slothower, Sheboygan; Andrew J. Paese, Plymouth, both of WI (US)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 09/513,640

(22) Filed: Feb. 25, 2000

(51) Int. Cl.$^7$ .............................. F16L 47/00; F16L 55/02; B67D 5/37
(52) U.S. Cl. ........................... 251/118; 251/127; 137/801
(58) Field of Search ................................ 251/118, 127; 137/801

(56) References Cited

U.S. PATENT DOCUMENTS

| | | |
|---|---|---|
| Re. 25,920 | 11/1965 | Moen . |
| D. 291,590 | 8/1987 | Bengtsson . |
| 1,459,666 * | 6/1923 | Adams . |
| 3,080,570 | 3/1963 | Weddendorf, Jr. . |
| 3,202,181 | 8/1965 | West . |
| 3,473,626 * | 10/1969 | Toda et al. . |
| 3,600,723 | 8/1971 | Mongerson . |
| 4,180,096 * | 12/1979 | Johnson ............................... 137/403 |
| 4,446,885 | 5/1984 | Nolden . |
| 4,722,509 | 2/1988 | Delker et al. . |
| 4,762,146 * | 8/1988 | Ewbank et al. .................... 137/625.3 |
| 4,821,765 | 4/1989 | Iqbal et al. . |
| 4,886,210 | 12/1989 | Gaffney et al. . |
| 5,010,917 | 4/1991 | Iqbal . |
| 5,095,934 | 3/1992 | Iqbal . |
| 5,115,974 | 5/1992 | Tobias et al. . |
| 5,148,832 * | 9/1992 | Lin ....................................... 137/615 |
| 5,390,896 * | 2/1995 | Smirl ................................... 251/127 |
| 5,537,696 | 7/1996 | Chartier . |
| 5,558,128 | 9/1996 | Pawelzik et al. . |
| 5,575,424 | 11/1996 | Fleischmann . |
| 5,608,928 | 3/1997 | Wang . |
| 5,755,261 | 5/1998 | Fukuzawa et al. . |
| 5,797,151 | 8/1998 | Ko . |
| 5,819,335 | 10/1998 | Hennessy . |
| 5,983,938 * | 11/1999 | Bowers et al. ................... 137/625.17 |

* cited by examiner

Primary Examiner—Kevin Shaver
Assistant Examiner—David A Bonderer
(74) Attorney, Agent, or Firm—Quarles & Brady LLP

(57) ABSTRACT

Faucets are disclosed which provide a gentle, gravity driven cascading flow of water. A mixing valve is positioned in a faucet body which permits exiting water to flow outside the mixing valve inside the faucet housing. The valve unit is thus partially submerged by the water that has passed through it. The pool of water helps to create a more gentle uniform flow of water. A flow regulator can be positioned in the fluid outlet of the valve.

9 Claims, 5 Drawing Sheets

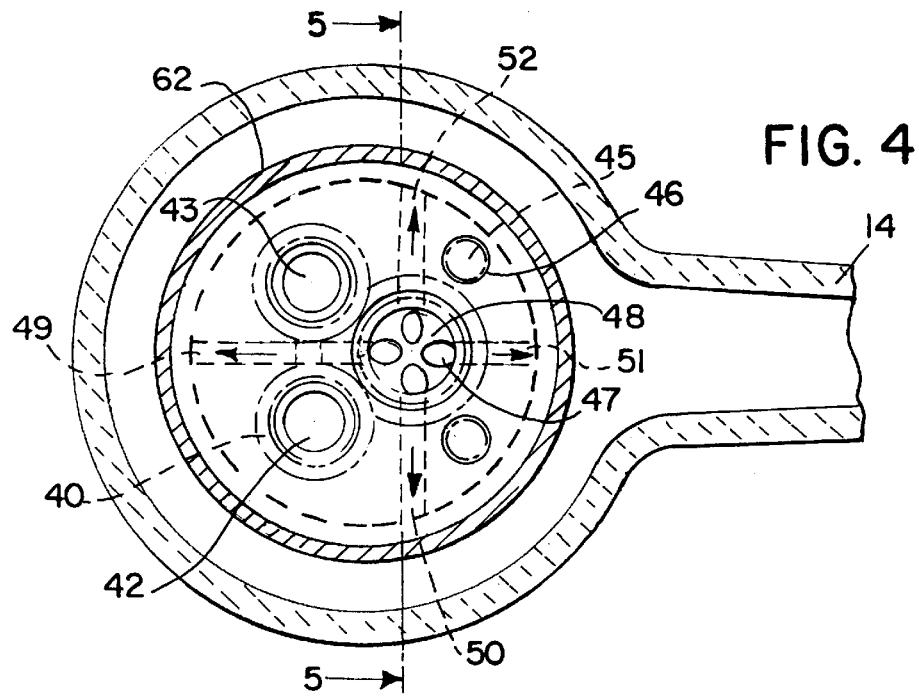
FIG. 4
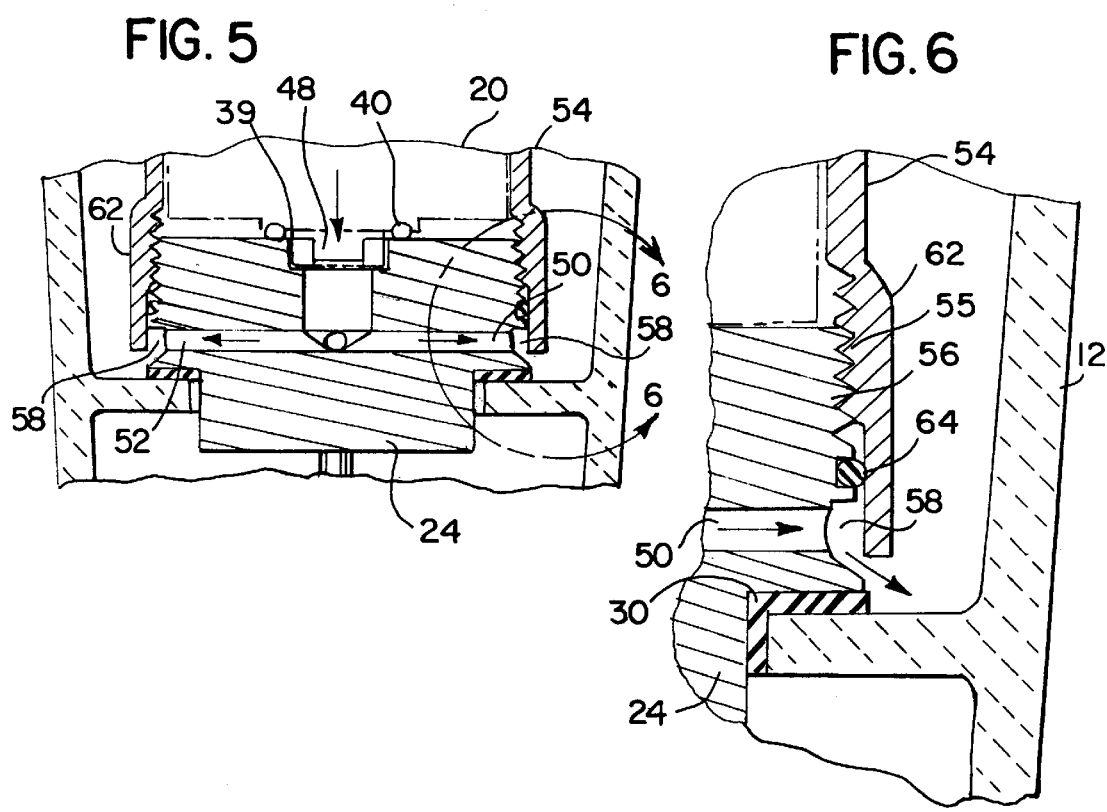
FIG. 5
FIG. 6

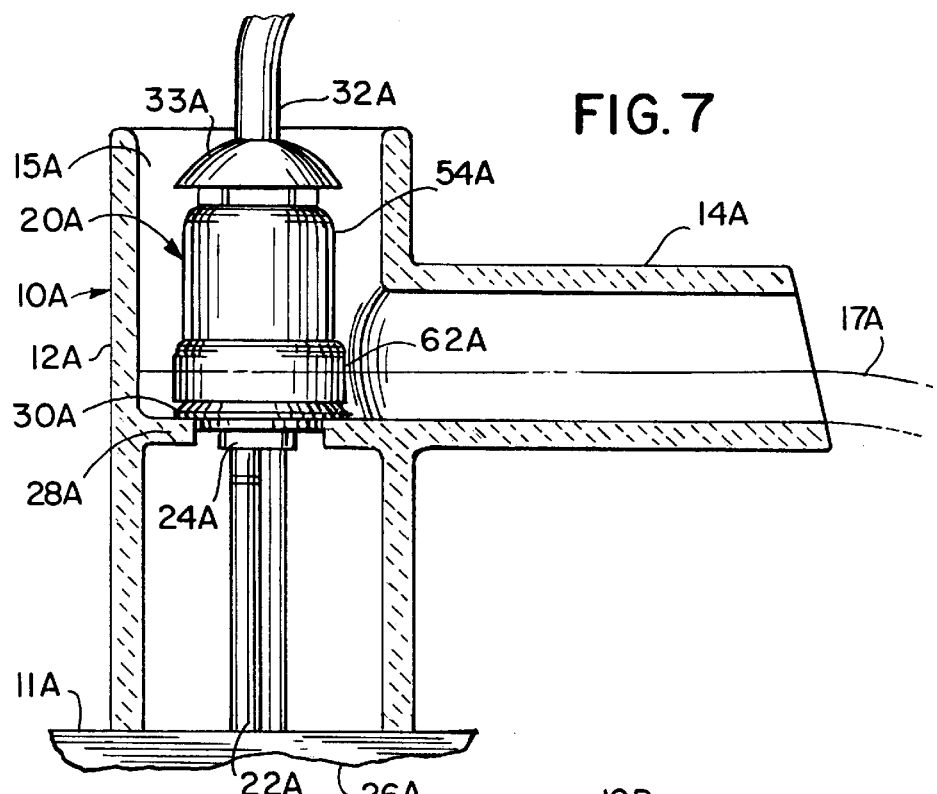
FIG. 7
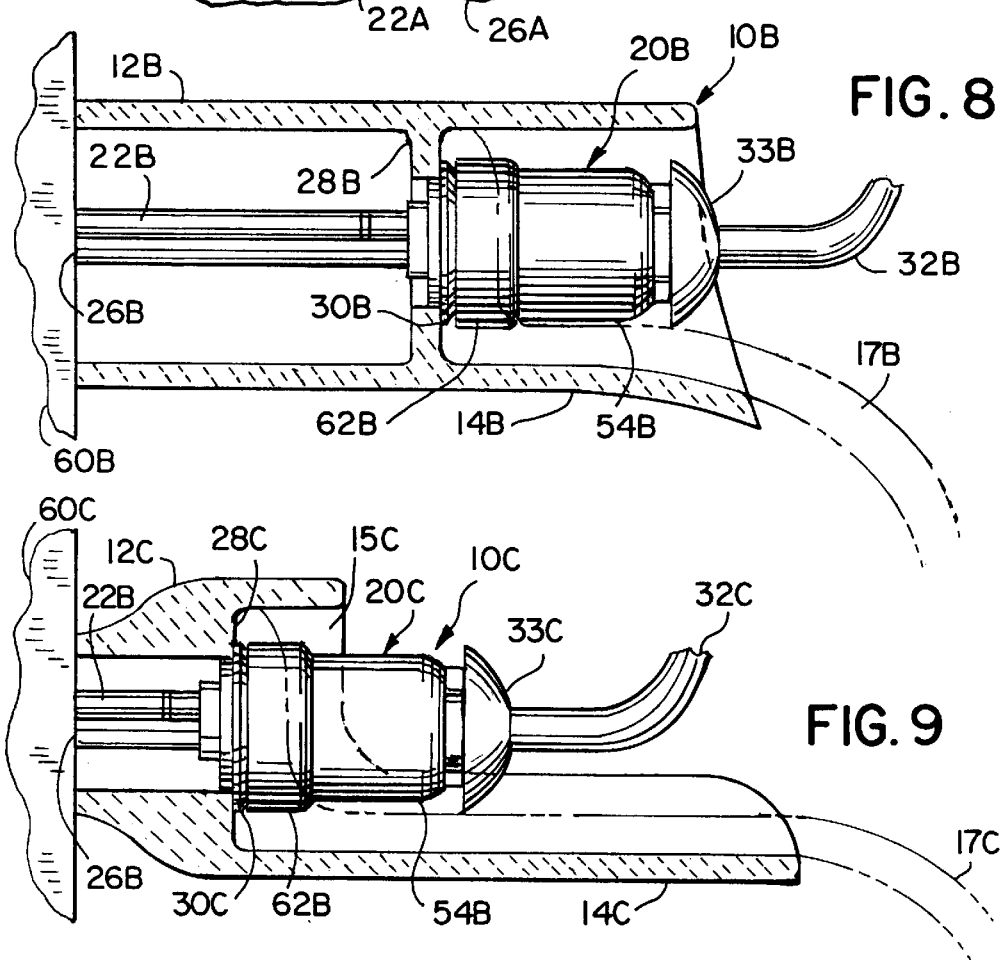
FIG. 8
FIG. 9

GRAVITY FLOW FAUCET

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention relates to faucets used adjacent plumbing fixtures such as lavatories and bath tubs. More particularly it relates to faucets that provide a gentle, gravity driven cascade of water.

Cascading water type faucets are particularly desired for aesthetic reasons, but may also have benefits in connection with bathing (e.g. ease of rinsing; gentle washing). Such faucets typically accept water at varying line pressures, provide a more constant pressure to avoid spurts and sprays, and in some of the most preferred faucets step down the pressure to provide very gentle flow. Relatively complex and large chambers are usually required to achieve these results, precluding the use of certain faucet body shapes which are desired for ornamental or other reasons.

For example, in U.S. Pat. Nos. 3,202,181 and 4,722,509 there were disclosed mixing valves positioned in faucet housings. However, these designs permitted the exiting water to be highly pressurized, which affected the appearance of the water as it exited.

U.S. Pat. Nos. 4,886,210 and 5,537,696 disclosed examples of sheet flow type spouts. However, they required relatively complex designs and restricted decorative options.

Thus, it can be seen that a need exists for faucets which can provide a cascading type water flow while also providing flexibility with respect to exterior housing shape.

SUMMARY OF THE INVENTION

In one aspect the invention provides a faucet having a faucet body with a bore that is in communication a fluid inlet and a fluid outlet passage. There is also a valve unit positioned in the bore for regulating fluid flow from the fluid inlet to the fluid outlet passage. The valve unit and the faucet body are constructed and arranged so as to allow fluid to flow between the outer periphery of the valve unit and the faucet body before flowing into the fluid outlet passage. In this regard, the valve unit is in the form of a cartridge positioned in an inner housing that allows fluid exiting the valve unit to pass outside the housing and then pass (e.g. rise) between the valve unit housing and the faucet body.

In a preferred form the faucet housing has a fluid outlet, a flow restrictor is positioned in the fluid outlet, and the fluid outlet has a lateral passage for directing fluid against an inside wall of the housing before it exits the housing. In this form the faucet body also has a seat in the bore with the valve unit located on the seat.

In other preferred form there is a seal positioned between the valve unit and the seat, an upper portion of the valve unit is spaced from an inside wall of the faucet housing, the valve unit is centrally positioned in the faucet body, and the outlet passage of the faucet body feeds into a spout that radially extends from the faucet body (e.g. at an essentially right angle relative to a longitudinal axis of the valve unit).

In another aspect the invention provides a faucet having a faucet body with an inlet, a bowl portion adjacent the inlet and in communication therewith, and a spout in fluid communication with the bowl portion and extending from the bowl portion. There is also a valve unit positioned in the bowl portion for regulating fluid flow from the fluid inlet to the bowl portion. The valve unit and the faucet body are constructed and arranged to allow fluid to pass in a direction away from the inlet in the bowl portion outside of and around the valve unit before exiting the spout.

The faucets of the present invention are adaptable for mounting either on a vertical surface or a horizontal surface. In either case, water is permitted to pass outside of the valve housing (inside the faucet body) before exiting. This partial immersion of the housing around the cartridge gives the water a desirable appearance by converting flow to a gentle, gravity driven cascading flow.

In another preferred embodiment there is a flow regulator positioned the fluid outlet. It is designed to slow the rate of fluid flow and renders in more constant.

The faucets can have a wide variety of faucet body configurations, thereby providing great flexibility in ornamental design. The faucets can achieve a cascading gentle flow effect with parts that can be inexpensively made. Further, these faucets can be assembled and installed quickly. Maintenance can be performed, if needed, even by those without special plumbing skills.

These and still other objects and advantages of the invention will be apparent from the description which follows. In the detailed description below preferred embodiments of the invention are described with reference to the accompanying drawings. These embodiments do not represent the full scope of the invention. Rather the invention may be employed in other embodiments.

BRIEF DESCRIPTION OF THE DRAWINGS

FIG. 4 is a sectional view taken along line 4—4 of FIG. 2;

FIG. 5 is a sectional view taken along line 5—5 of FIG. 4;

FIG. 6 is a fragmentary sectional view taken along line 6—6 of FIG. 5;

FIG. 7 is a sectional view of an alternative embodiment (with the same valve unit, but a different faucet body); and FIGS. 8–10 are views similar to FIG. 7, albeit of three additional alternative embodiments (in each case with the valve unit the same as used with the first two embodiments, and the faucet body changed).

DETAILED DESCRIPTION OF THE INVENTION

Figure 1:
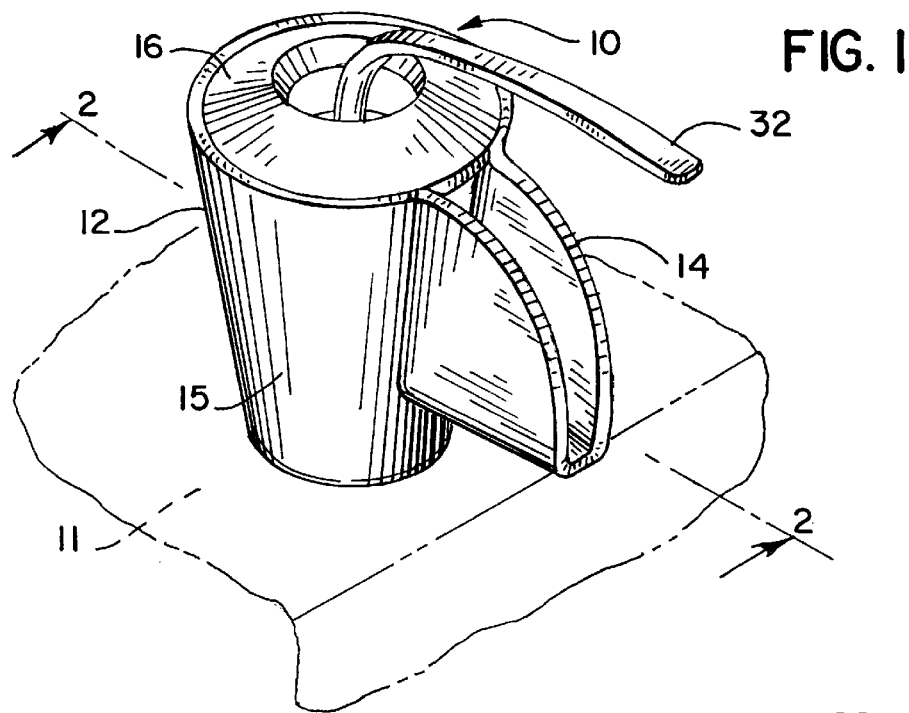
FIG. 1 is a top perspective view showing a first preferred embodiment of the invention, mounted on a lavatory rim.
Figure 2:
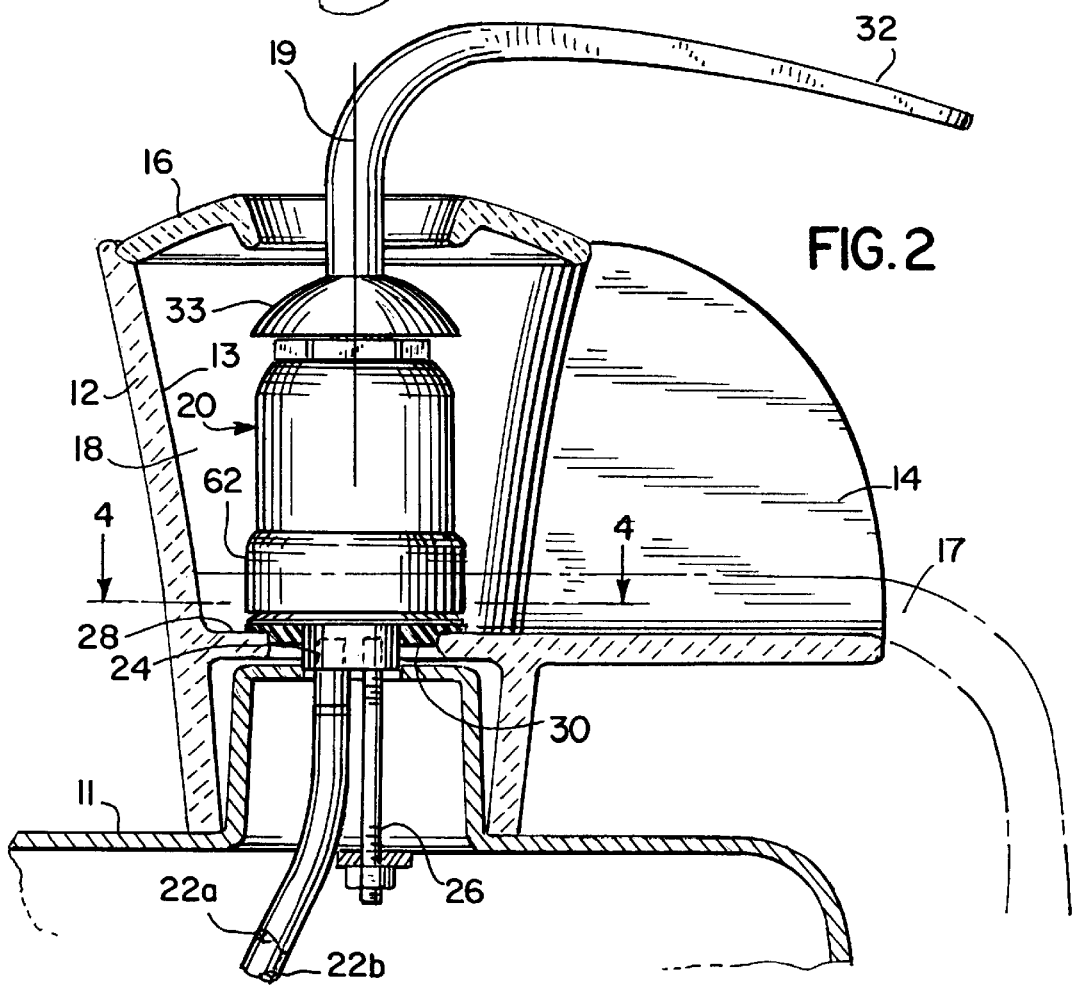
FIG. 2 is a sectional view taken along line 2—2 of FIG. 1.

Referring first to FIGS. 1 and 2, a faucet (generally 10) is supported on a counter 11. It includes a faucet body 12 composed of a ceramic material which has a bowl portion 15 with a laterally extending trough or spout 14. The spout 14 extends at a right angle from the longitudinal axis 19. Faucet body 12 has a bore 18 into which is placed a cartridge valve (generally 20), centrally located and spaced from an inside wall 13 of the faucet body 12. A dome 33 is placed over the cartridge valve, and a cover 16 is placed on top of the faucet body 12 in this embodiment.

Ledge 28 extends inwardly from the faucet body 12 to afford a seat for the cartridge valve 20, which actually rests on intermediate seal 30. Water inlet lines 22a and 22b supply water to the cartridge valve 20 through the base portion 24. A bolt 26 secures the base portion 24 to the counter 11. The flow of water through the valve 20 is controlled by the handle 32.

Figure 3:
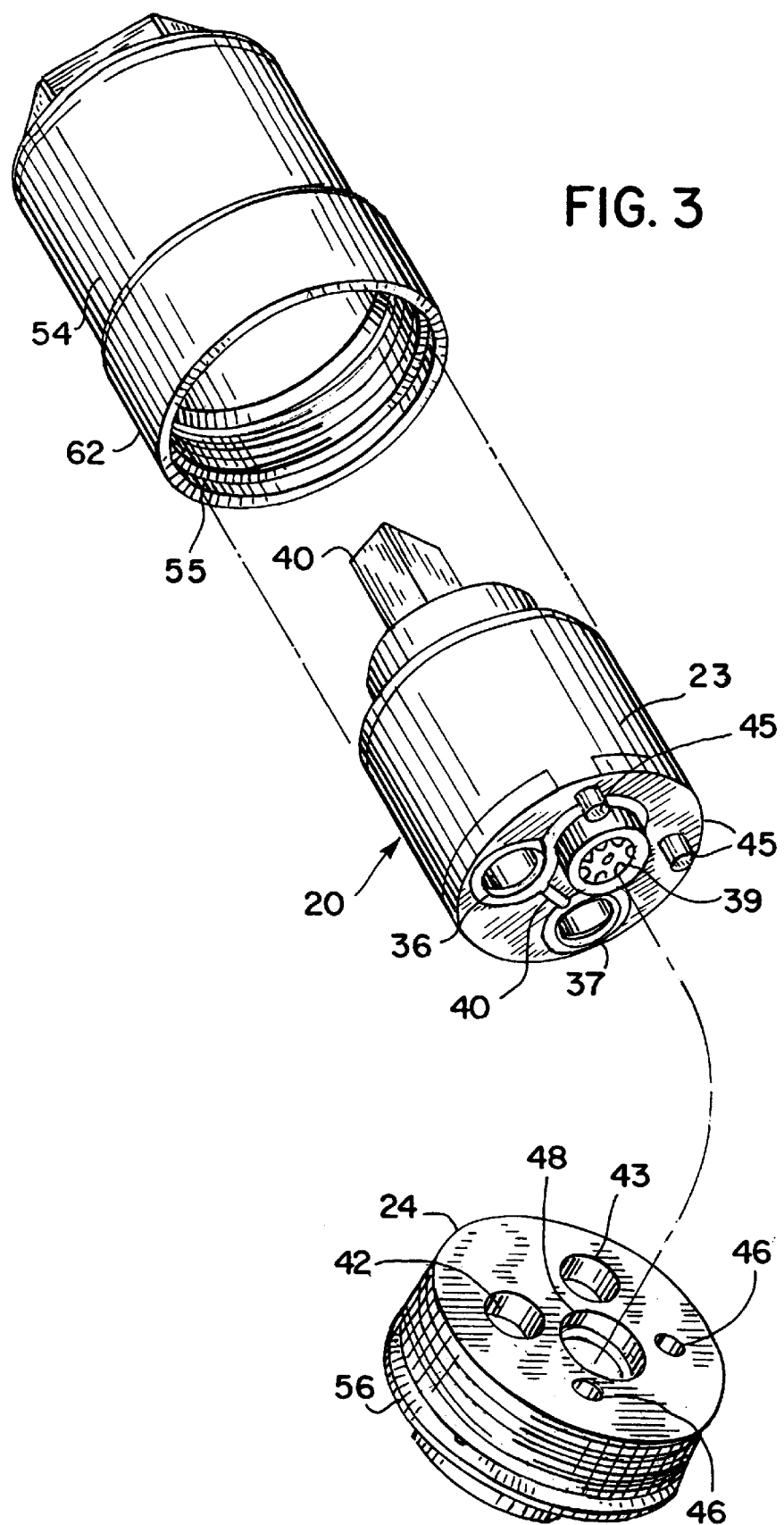
FIG. 3 is an exploded perspective view of a valve unit constituting a component of the preferred faucet.

Referring next to FIGS. 3 and 4, the cartridge valve 20 is of a type which controls the flow and the temperature of water by a movable disk placed over a sliding one. The preferred valve in this instance includes a fluid regulating section 23 with a hot water inlet 36 and a cold water inlet 37. An outlet for fluid has placed therein a flow restrictor 39. Hot and cold water inlets 42 and 43, respectively, are provided in a cartridge base portion 24 and are aligned with the hot and cold water inlets 36 and 37, respectively, of the flow regulating section 23. This alignment is afforded by corresponding locator projections 45 and the locator openings 46 in the base portion 24.

The water control portion of the cartridge units are quite similar to those used in other faucets such as those described in U.S. Pat. Nos. 5,575,424 or 5,095,934. Certain modifications to those valves will be apparent from the description herein.

For example, the flow restrictor 39 is orientated into a compartment 48 in the base portion 24. This compartment has passageways 49, 50, 51 and 52 (see especially FIG. 4) extending therefrom in a cross-like manner each with an opening 47 in compartment 48.

A seal member 40 surrounds the hot water inlet 36 and the cold water inlet 37, as well as the restrictor 39. This affords a sealing around the respective hot and cold water inlets 42 and 43 and the compartment 48 in the base portion 24.

As best seen in FIG. 6, valve unit housing 54 is provided which includes a skirt portion 62 with internal threads 55 which engage the external threads 56 in the base portion 24 to enclose the cartridge valve therein. The skirt portion 62 is spaced from the base portion 24 when threads 55 are fully engaged. This provides a passage 58. A seal 64 is placed between skirt 62 and the base portion 24.

The flow of water from the cartridge valve through the base portion 24 is best seen in FIGS. 4–6. The water exiting from the flow restrictor 39 will enter the compartment 48. There it will be directed in four different directions through the passageways 49–52. The water will pass into passage 58 against the housing 54, and then down and up around the housing 54, so as to pass and between the outside of skirt 62 and the inside of the faucet body 12. This is shown with respect to the level of water 17 indicated in FIG. 2. This provides a relatively calm pool of slow moving water that provides a cascading effect for the water as it flows outwardly through the trough 14.

It is unusual that the outside of the valve cartridge is to be immersed in this manner. Moreover, as the level 17 increases, the calming effect on the water is even more apparent.

Alternative embodiments of the gravity flow faucet are shown in FIGS. 7–10 with the same or similar components referred to with the same numbers except with the "A", "B", "C", and "D" suffix. Referring to FIG. 7, gravity flow faucet 10A differs from faucet 10 in the configuration of the faucet body 12A. There it will be seen that the faucet body has a more tubular design. The trough 14 is also tubular and more enclosed. The function and water flow through faucet 10A is the same as with faucet 10.

Faucets 10B and 10C shown in FIGS. 8 and 9 differ from the previous two in that their orientation is horizontal rather than vertical. These are designed to be connected to vertical walls such as 60B and 60C. In these embodiments, the trough sections 14B and 14C do not extend at right angles from the faucet body as in faucets 10 and 10A. Referring particularly to FIG. 9, it is seen that trough 14C is open over the top and along most of its sides.

Figure 10:
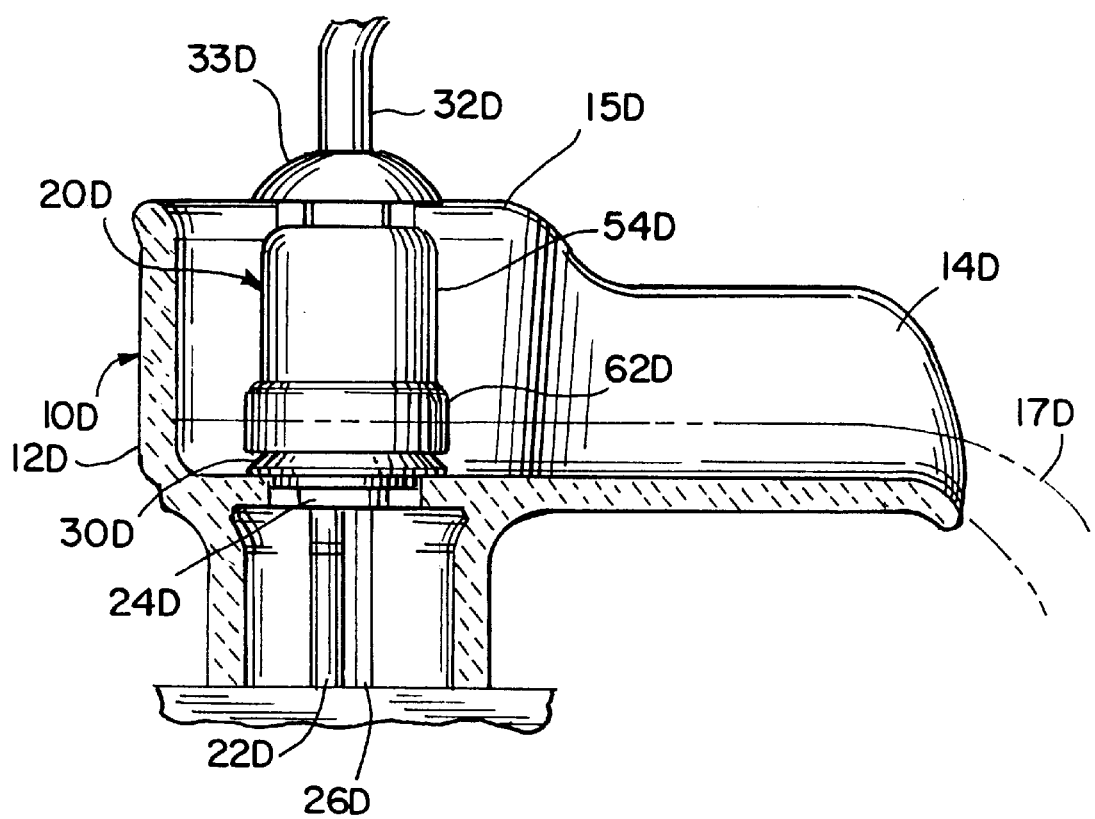

Faucet 10D, shown in FIG. 10, is similar to that of the FIG. 7 embodiment except that it has a longer and more open trough 14D. It also has a shorter faucet body 12D with a more open bowl portion 15D (and no corresponding part to cover 16). The function and water flow through faucet 10D is the same as with faucet 10.

It will therefore be seen that there is now provided a faucet which affords a gravity driven gentle flow of cascading water. The gravity flow faucet is adaptable to different faucet bodies, as well as to either vertical or horizontal orientation with respect to a supporting surface. The pressure of the inlet water is largely dissipated before the water reaches the trough.

The foregoing detailed description has been for purposes of illustration. A number of modifications and changes may be made without departing from the spirit and scope of the present invention. For example, while a particular mixing cartridge valve has been utilized in directing water, various other types of cartridges (e.g. non-mixing single temperature) could be utilized.

Further, while a dome 33 has been indicated for use in conjunction with the valve cartridge, this part can be eliminated. In a similar manner, the cover 16 could be eliminated (as indicated with respect to the FIG. 10 embodiment).

Moreover, while preferred faucet bodies have been indicated as being composed of ceramic, this is for aesthetic purposes. Other materials could be used (e.g. metal). Still other modifications will be apparent from this patent to those skilled in the art. Therefore, the invention should not be limited by the specific embodiments.

Industrial Applicability

The invention provides faucets for controlling the flow of water so that the water flows in a gentle, aesthetically pleasing cascading. This is suitable for use in plumbing installations.

We claim:

1. A faucet, comprising:
   a faucet body having a bore that is in communication with a fluid inlet and a spout; and
   a valve unit positioned in the bore for regulating fluid flow from the fluid inlet to the spout, the valve unit and the faucet body being constructed and arranged to allow fluid exiting the valve unit to flow between the outer periphery of the valve unit and the faucet body before flowing into the spout;

wherein the valve unit is in the form of a cartridge positioned in a valve unit housing that allows fluid to pass out the valve unit housing and then rise outside of the valve unit between the valve unit housing and the faucet body;

wherein the valve unit housing has a fluid outlet with a lateral passage for directing fluid against an inside wall of the valve unit housing before it exits the valve unit housing.

2. The faucet of claim 1, further comprising a flow restrictor positioned in the fluid outlet of the valve unit housing.

3. The faucet of claim 1, wherein the faucet body includes a seat in the bore and the valve unit is located on the seat.

4. The faucet of claim 3, wherein a seal is positioned between the valve unit and the seat.

5. The faucet of claim 1, wherein an upper portion of the valve unit is spaced from an inside wall of the valve unit housing.

6. The faucet of claim 1, wherein the valve unit is centrally positioned in the faucet body.

7. The faucet of claim 1, wherein the spout extends from the faucet body at an essentially right angle relative to a longitudinal axis of the valve unit.

8. The faucet of claim 1, wherein the faucet body is adapted to be connected to a vertical wall.

9. The faucet of claim 1, wherein the faucet body is adapted to be connected to a horizontal wall and the valve unit is positioned above the fluid inlet.

* * * * *